United States Patent [19]

Harvey

[11] Patent Number: 4,753,288
[45] Date of Patent: Jun. 28, 1988

[54] POLYMERIC SHUTTER ASSEMBLY

[75] Inventor: William O. Harvey, Cadillac, Mich.

[73] Assignee: Kysor Industrial Corporation, Cadillac, Mich.

[21] Appl. No.: 921,477

[22] Filed: Oct. 22, 1986

[51] Int. Cl.⁴ .................... F01P 7/10; F01P 7/02; B60K 11/04

[52] U.S. Cl. .................... 165/98; 123/41.04; 123/41.58; 180/68.1; 180/68.6

[58] Field of Search ............. 165/98, 99; 123/41.04, 123/41.05, 41.06, 41.07, 41.58, 41.59, 41.60; 180/68.1, 68.4, 68.6

[56] References Cited

U.S. PATENT DOCUMENTS

| | | | |
|---|---|---|---|
| 1,393,917 | 10/1921 | Snell | 165/98 |
| 1,576,507 | 3/1926 | Eliasik | 165/98 |
| 2,200,733 | 5/1940 | Agerell et al. | 165/98 |
| 2,248,094 | 7/1941 | Kysor | 236/35 |
| 2,805,027 | 9/1957 | Ferris | 236/35.2 |
| 3,198,298 | 8/1965 | Ferris | 236/35.2 |
| 3,759,054 | 9/1973 | Graber | 62/183 |
| 3,759,056 | 9/1973 | Graber | 62/183 |

FOREIGN PATENT DOCUMENTS

| | | | |
|---|---|---|---|
| 236309 | 7/1925 | United Kingdom | 165/98 |
| 1153361 | 5/1969 | United Kingdom | 123/41.04 |

Primary Examiner—Ira S. Lazarus
Assistant Examiner—Peggy Neils
Attorney, Agent, or Firm—Price, Heneveld, Cooper, DeWitt & Litton

[57] ABSTRACT

There is disclosed a vehicle engine shutter assembly, basically of polymeric material forming a peripheral frame, a plurality of vertical vanes which are rotatable on vertical axes between an open condition and a closed overlapping condition by a horizontally slidable actuator bar which has curvilinear recesses receiving curved lobes on the vane axles. The closed vanes preferably have notched, interfitting leading edges and trailing edges that interfit to form said traps to abate engine noise. The vanes and actuator bar are retained in position on the frame by a lock bar that has resilient legs than snap in place.

11 Claims, 15 Drawing Sheets

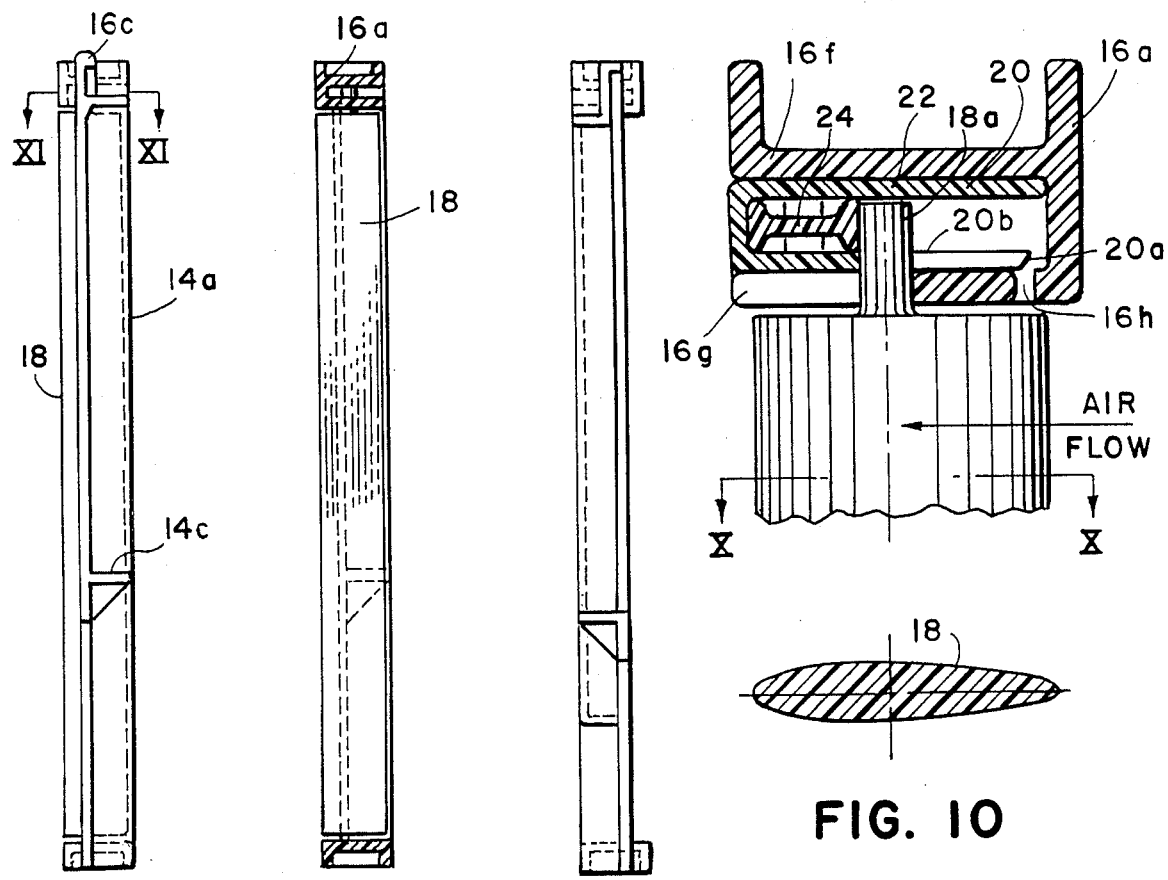
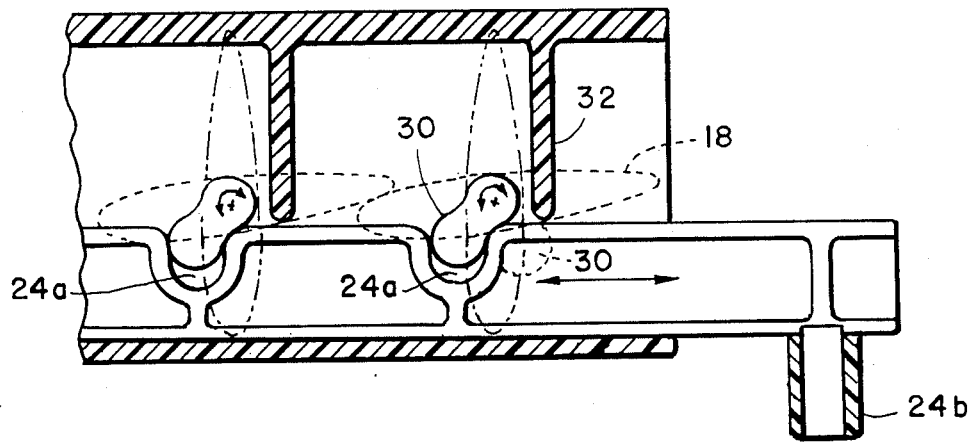

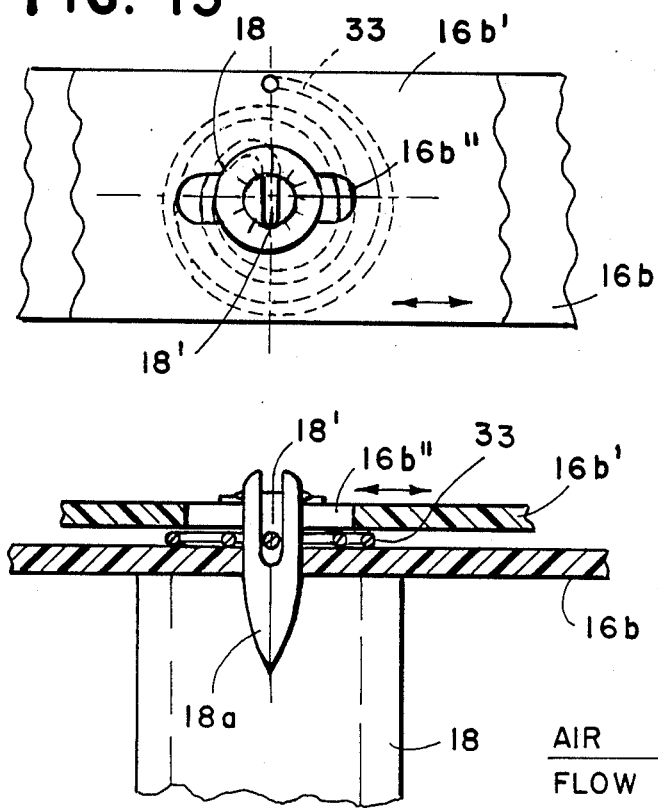
FIG. 13
FIG. 14
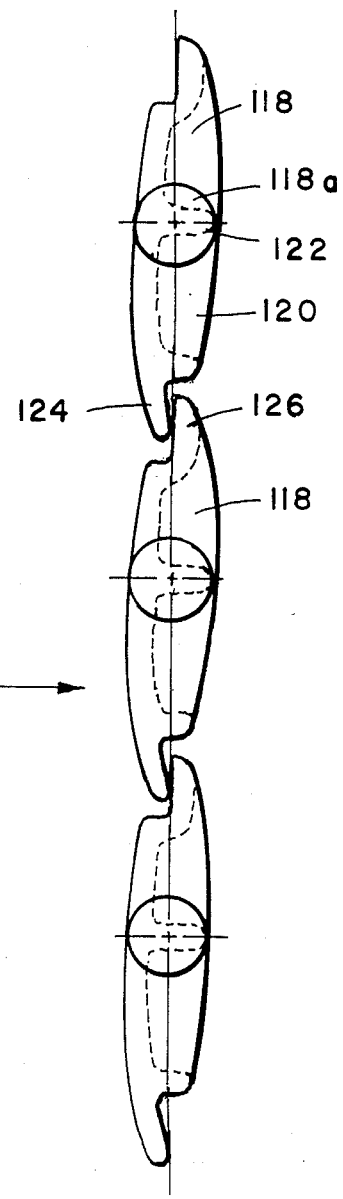
FIG. 12

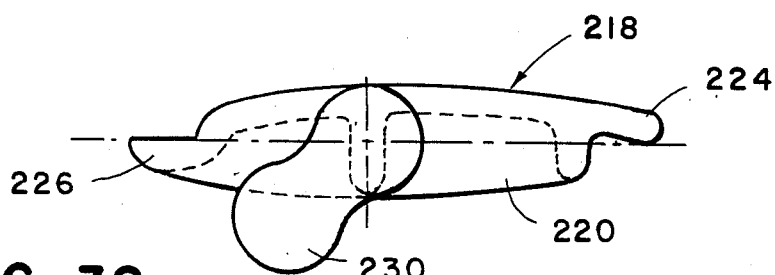
FIG. 38
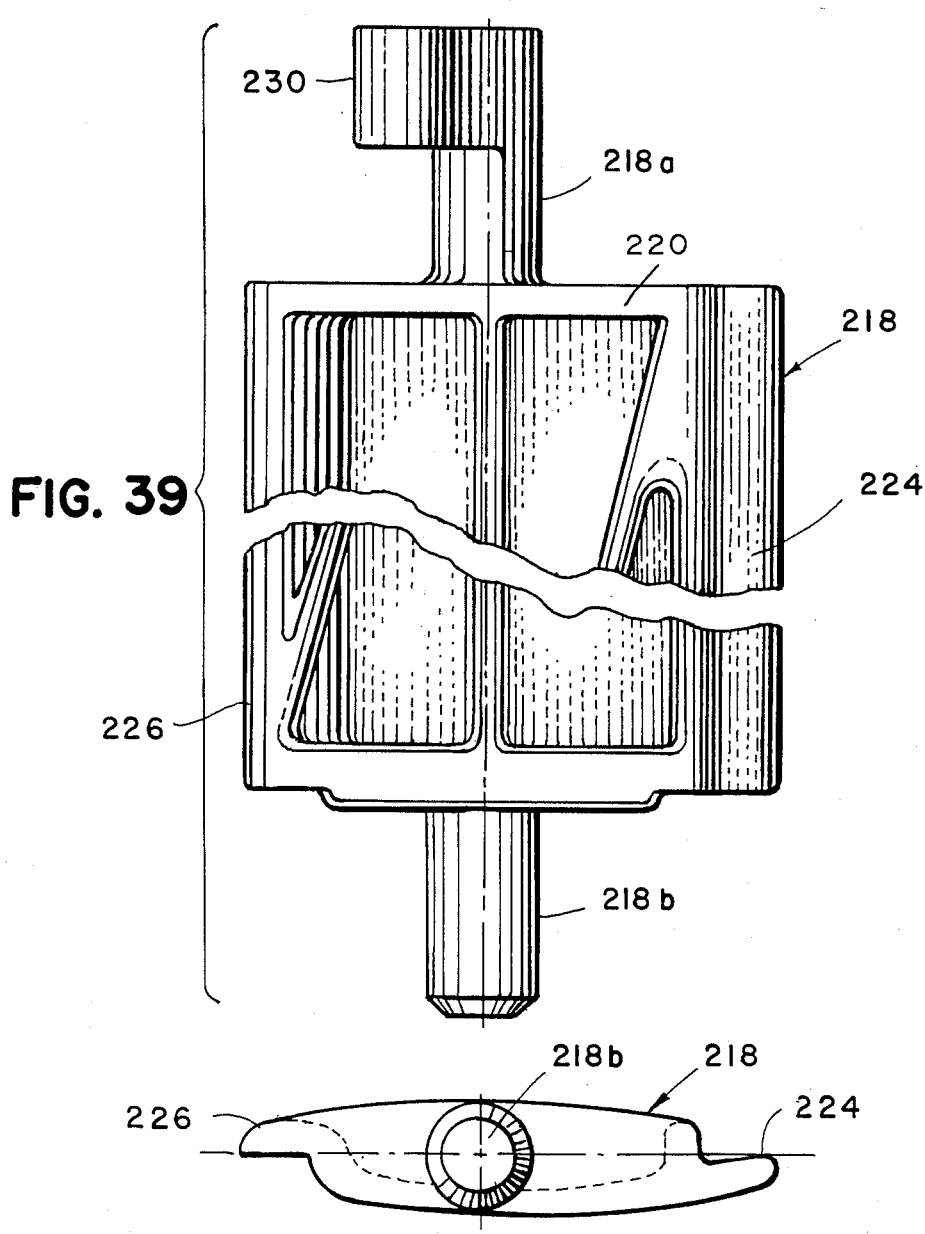
FIG. 39
FIG. 40

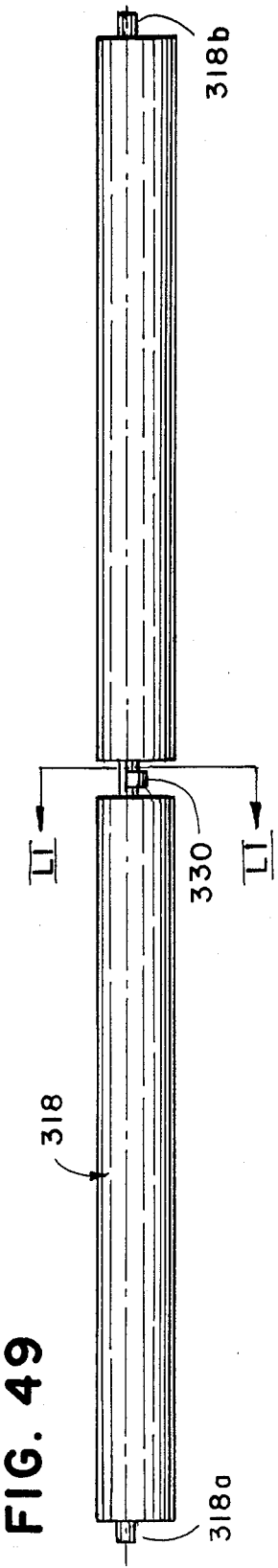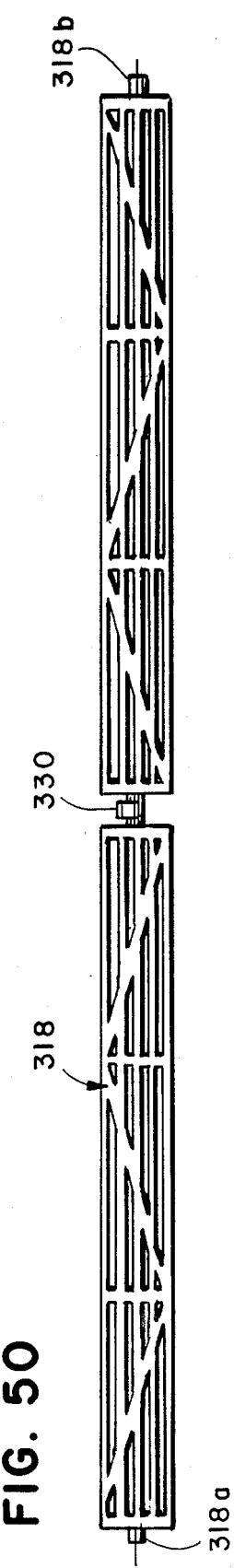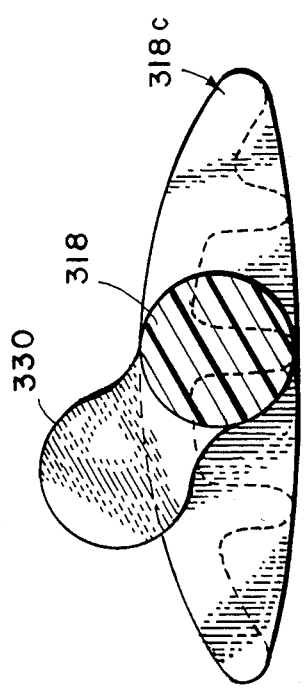
FIG. 49
FIG. 50
FIG. 51

POLYMERIC SHUTTER ASSEMBLY

BACKGROUND OF THE INVENTION

This invention relates to vehicle engine shutter assemblies. Vehicle shutter mechanisms are commonly mounted adjacent to and parallel a vehicle engine radiator, to control air flow through the radiator and thereby regulate engine temperature. Typical shutter mechanisms are disclosed in U.S. Pat. Nos. 2,248,094 to Kysor, 2,805,027 to Ferris, 3,198,298 to Ferris, and 3,759,054 and 3,759,056 to Graber. Such mechanisms are rather complex and sophisticated, typically having more than 100 component parts. The mechanism is composed of fabricated metal vanes, frames and operators, providing variable shutter positions over a wide range from fully open to fully closed, to achieve highly controlled air flow rates. As such, the mechanism is also relatively expensive and typically used only on large truck tractors where the expense is fully justified. The mechanism is rarely used on smaller vehicles such as automobiles. Yet, the use of a shutter system on automobiles would improve efficiency of operation.

Moreover, in the development of the present invention, it was determined that the appropriate shutter assembly can serve other purposes too. Some modern automobiles have considerable engine compartment sound insulation in efforts to reduce noise transmission to a fraction of the original level. This is especially useful for diesel engines, particularly when cold, because the engine clatter is then at a maximum. In spite of the engine compartment sound insulation now used, however, there is considerable engine noise transmitted through the front of the compartment, i.e., through the radiator. This noise is particularly noticeable when the vehicle is at a standstill or slowly moving, e.g., in heavy traffic. Obviously, large quantities of air must be caused to flow through openings in the radiator under normal driving conditions, but at idling speeds, such air flow is not necessary. The present invention achieves noise abatement and aerodynamic drag reduction as well as engine temperature control.

SUMMARY OF THE INVENTION

An object of this invention therefore is to provide a novel relatively inexpensive engine shutter assembly that achieves sound emission suppression as well as engine temperature control. This, combined with the usual acoustical insulation around the engine compartment, enables the engine compartment to be closed off, to thereby reduce noise level to a small fraction of its original volume.

The novel shutter assembly is sufficiently simple, inexpensive and small in size to be applicable to, and cost effective for, standard automobiles. The entire assembly, including frame, vanes and vane pivoting mechanism, is of injection moldable design. It can be made at a low cost and yet provide good performance. It is thin in depth. Its actuation is within the shutter envelope, i.e., within the outline of the shutter assembly. It is composed of a lightweight, readily molded material, preferably polymeric material. The vanes can be vertical or horizontal, pivotally movable between fully open and fully closed positions by an actuator mechanism employing a single slide bar with integral sockets interfitting with "FIG. 8", i.e., "dumbbell" cam followers on the vanes. The closed vanes overlap, forming acoustical sound traps. The fully open vanes are restrained from moving past center by engagement of the cam followers with integral stops on the frame.

There is a relatively small number of parts, enabling a low cost of assembly, a small inventory and low machining cost.

The axles of the vanes are attached into sockets in the frame, the axles on at least one end being inserted into open end slots which are then closed by a lock bar. The vane elements have a curvilinear front face. They are solid, or alternatively have hollow rear faces with reinforcing ribs, and can have a protruding leading edge and tail edge. The leading edge of each vane preferably interfits with and overlaps a notched tail edge of the adjacent vane.

These and other objects, advantages and features of the invention will be apparent upon studying the following specification in conjunction with the drawings.

BRIEF DESCRIPTION OF THE DRAWINGS

FIG. 6 is an end view taken on plane VI—VI of FIG. 1;

FIG. 7 is a sectional view taken on plane VII—VII of FIG. 1;

FIG. 8 is an end elevational view taken on plane VIII—VIII of FIG. 1;

FIG. 9 is a greatly enlarged cross sectional view taken on plane IX—IX of FIG. 1;

FIG. 10 is a sectional view taken on plane X—X of FIG. 9, showing a solid type vane;

FIG. 11 is an enlarged sectional view taken on plane XI—XI of FIG. 6;

FIG. 12 is an end elevational view of three vanes of an alternative vane embodiment;

FIG. 13 is a fragmentary top elevational view of a modified vane assembly having a toroidal biasing spring biasing the vane to the open or closed condition;

FIG. 14 is a fragmentary sectional elevational view of a portion of the vane assembly in FIG. 13;

FIG. 38 is an enlarged end elevational view of the top end of the vane in FIGS. 35-37;

FIG. 39 is an enlarged fragmentary elevational view of the rear of the vane in FIG. 37;

FIG. 40 is an enlarged bottom view of the vane in FIG. 39;

FIG. 49 is a front elevational view of a vane which has a center mounted actuator;

FIG. 50 is a rear elevational view of the vane in FIG. 49;

FIG. 51 is a sectional, enlarged view taken on plane LI—LI of FIG. 49;

DESCRIPTION OF THE PREFERRED EMBODIMENTS

Figure 1:
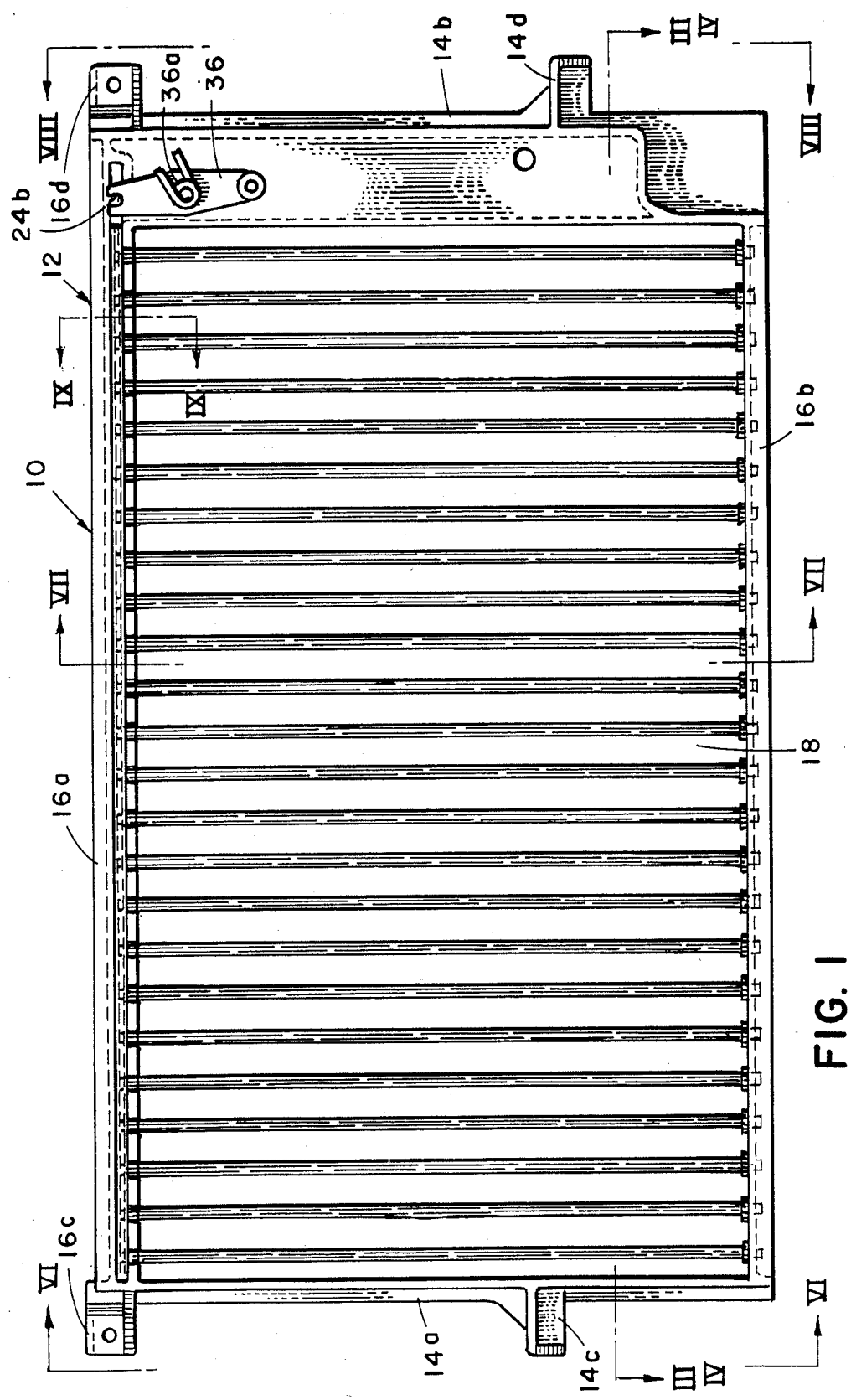
FIG. 1 is a rear elevational view of the first embodiment of the novel shutter assembly.
Figure 1A:
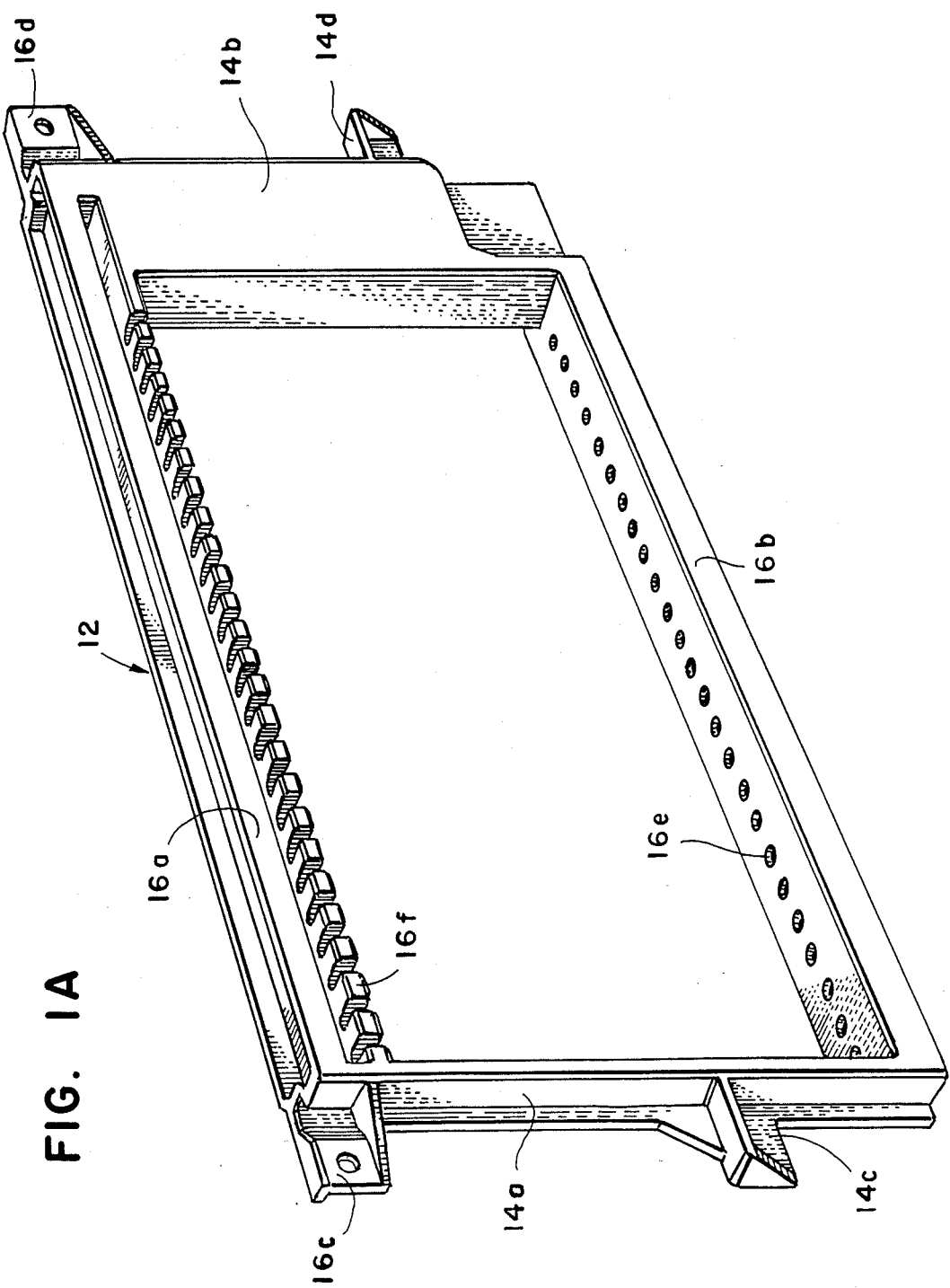
FIG. 1A is a perspective view of the frame of the assembly in FIG. 1.

Referring now specifically to the drawings, the shutter assembly 10 there depicted includes a peripheral frame 12 having a pair of parallel, spaced side portions 14a and 14b, and parallel top and bottom portions 16a and 16b, these four portions preferably being molded of a polymeric material into an integral unitary structure. Alternatively, the portions may be made individually and assembled into a framework. Suitable mounting flanges such as laterally and outwardly projecting flanges 14c and 14d on side portions 14a and 14b are provided to interfit with the automobile, with additional laterally and outwardly extending fastening flanges 16c and 16d provided on the upper portion of the frame. Thus, the frame can be mounted adjacent and parallel to a conventional automobile radiator, e.g., behind the radiator and forwardly of the fan.

Figure 2:
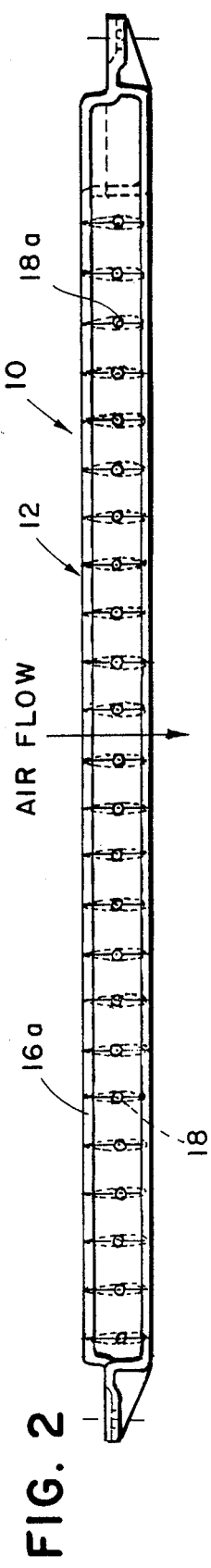
FIG. 2 is a top plan view of the assembly in FIG. 1.
Figure 3:
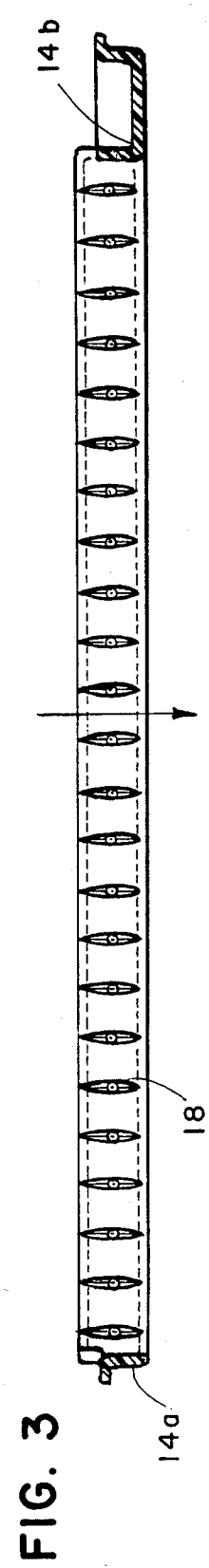
FIG. 3 is a sectional view taken on plane III—III of FIG. 1, but showing the vanes in an open position.
Figure 4:
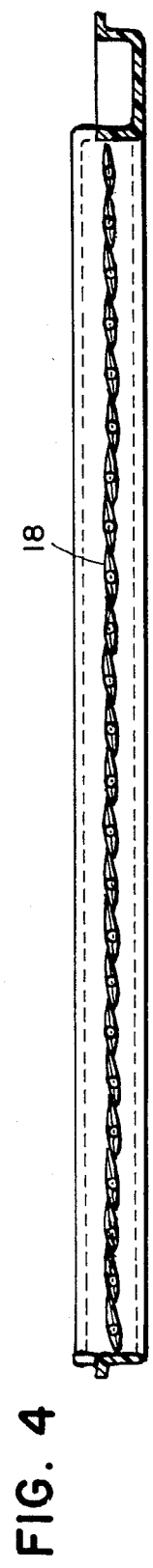
FIG. 4 is a sectional view comparable to that in FIG. 3, but showing the vanes in a closed overlapping condition.
Figure 5:
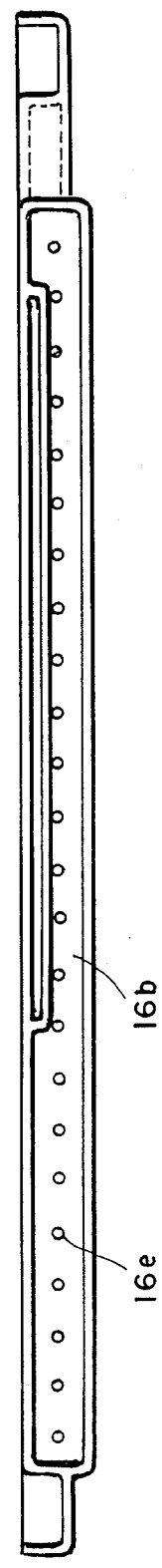
FIG. 5 is a bottom view of the assembly in FIG. 1.
Figure 15:
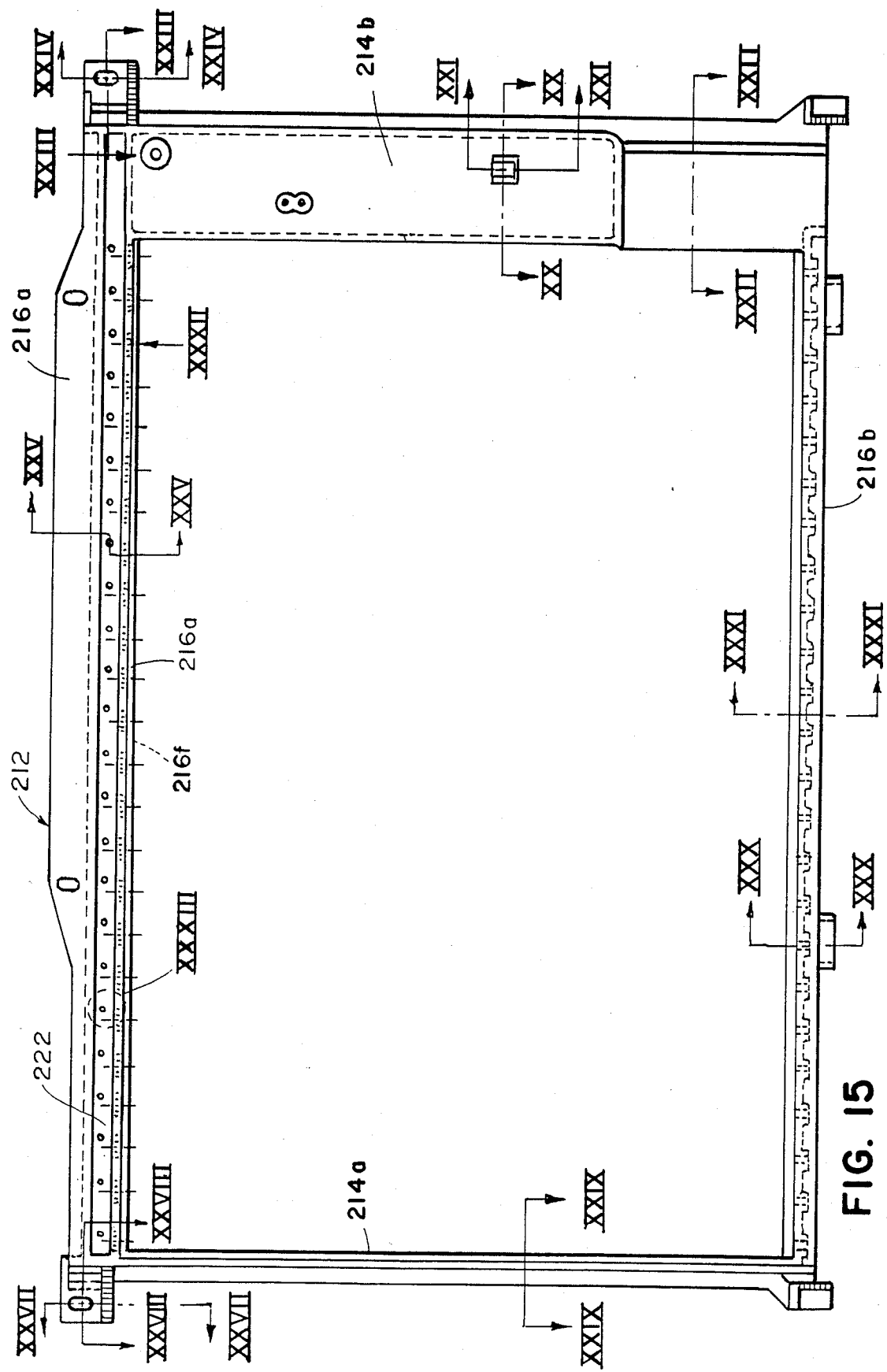
FIG. 15 is an elevational view of the frame of another embodiment of the invention.
Figure 16:
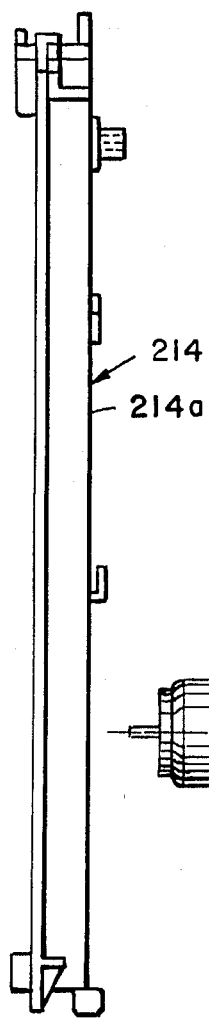
FIG. 16 is an end elevational view from the left end of FIG. 15.

Mounted on upper and lower portions 16a and 16b are a plurality of like, pivotal, vertically elongated air control vanes 18 on vertical axes. They are movable between a fully open position (FIGS. 1, 2 and 3) and a fully closed position (FIG. 4). These vanes are parallel to each other, being pivotally mounted at both the top and bottom frame portions. Each vane 18 may be of solid cross section with an aerodynamic teardrop configuration as depicted in FIG. 10. Alternatively, each vane 118 may be of a skeletal configuration hollow to the rear as in FIG. 12. Each vane is shown mounted on a vertical pivot axis having upper and lower axles 18a axially aligned with each other, and interfitted with the respective upper and lower portions of the frame. The vanes, when rotated on their axles to a closed position, overlap each other to close off air flow into the engine compartment and to muffle noise emitted from the engine compartment. These axles are preferably stub axles which are integrally formed with the molded vanes. Each vane has a smooth, streamlined convex curvilinear front surface. Each has its pivot axis laterally offset from the vane center so that air pressure during vehicle movement will help hold the closed vanes tightly together without flutter.

Bottom frame portion 16b has a plurality of generally cylindrical, equally spaced sockets 16e, which extend vertically down through the bottom portion panel (FIG. 7). These receive the lower cylindrical stub axles of the vanes. The through sockets 16e allow any dirt to fall through. Aligned with these spaced sockets is a like plurality of axle-receiving sockets 16f in the top portion. However, the sockets in the top portion are horizontal dead-end slots which are open on one end of the slot to allow the upper stub axles on the vanes to be laterally slid into place after the lower axles are inserted into the bottom sockets. These upper stub axles are then retained in the inserted position by an elongated, resilient, polymeric snap insert locking bar 20 (FIG. 9). It has a U-shaped cross sectional configuration. It is shown in FIGS. 7 and 9 to fit into an elongated, rearwardly open cavity 22 between upper wall 16f and spaced lower wall 16g (FIG. 9), being slid forwardly into place. Insert 20 includes vertically extending barbs or bayonet type protrusions 20a to snap into orifices 16h in the upper frame portion 16a. The lower leg of resilient U-shaped insert 20 has spaced, open ended slots 20b (FIG. 9) to allow it to be slid over the respective upper axles of the vanes. These slots are spaced equal to the spacing of sockets 14e.

This insert retainer also secures vane cam actuator slide bar 24 in place and provides bearing surfaces for the cam actuator and vane axles (FIG. 9). Slide bar 24 is laterally elongated transversely of the pivotal axes of the vanes and is movable along its length to shift the vanes from closed to open position and vice versa. More specifically, this actuator slide bar 24, a polymeric member having a generally I-shaped cross sectional configuration, has a plurality of spaced, generally U-shaped recesses 24a (FIG. 11). Each recess has a semicircular concavity and a pair of convex curvilinear outer edges to serve as cams. Each recess slidingly receives one end lobe of a FIG. 8 cam follower 30. Each cam follower has the other lobe affixed to the upper axles of the vanes. Movement of actuator bar 24 in its longitudinal direction (see arrow in FIG. 11) causes the interengaged lobes of FIG. 8 or dumbbell cam followers 30 to be pivoted around the axis of the vane axles, and thereby cause the vanes to pivot between the fully open and fully closed positions while movement of cam actuator bar 24 is restricted to its longitudinal dimension by locking bar 20 (FIG. 9). The two positions of the vanes and cam followers are shown in dotted lines in FIG. 11. A plurality of stop elements 32 integrally formed on upper frame 14a extend adjacent each of the FIG. 8 cam followers, so that the dumbbell cam followers abut the outer ends of the stop elements (see phantom line in FIG. 11), when the vanes reach the fully open position, to arrest the vanes against any further rotation past center. I.e., this arrangement makes possible the rotation of the vanes without outward movement of the control bar.

The shutter assembly is shown in the vertical arrangement. However, the features of the illustrated top and bottom frame portions can alternatively be incorporated into the opposite side portions, to cause the vanes to be pivotal on parallel horizontal axes.

Actuator slide bar 24 may be shifted by a suitable cam follower 36 (FIG. 1) having one end pivotally engaged with the transversely extending pin 24b (FIG. 11) at the end of the slide bar. This pivotal crank is actuated by any suitable electrothermic, pneumatic, hydraulic, electromagnetic or mechanical actuator to rotate about its pivot 36a and thereby shift the slide bar back and forth for rotating the vanes between fully open and fully closed positions.

Instead of the solid vane depicted in FIG. 10, each vane can be of the skeletal open back configuration in FIG. 12. In this instance, the forward face of the vane is still convex curvilinear in configuration for lessening of aerodynamic drag. This vane has two end panels 120 for mounting two integral axles 118a. The rear of the vane is open, i.e., hollow, there being a central reinforcing rib 122 along the length of the vane. Each vane in this depicted embodiment has an elongated protruding offset leading edge 124 and a cooperative elongated protruding offset trailing edge 126. The leading edge of one vane overlaps and interfits with the trailing edge of the adjacent vane when the vanes are closed, as depicted in FIG. 12. The overlapped edges create noise traps to minimize noise transmission from the engine compartment forwardly through the radiator. The vanes are actuated with the FIG. 8 cam followers and actuator slide bar previously described.

In some installations, it may be desired to have a fail safe feature for each vane. Therefore, if one or more of the vanes should happen to stick in the open or closed position, the remaining vanes could be biased to the closed or open condition respectively. This is to prevent all vanes being stuck as for example in the closed position, to cause engine overheating and damage. Specifically, in FIGS. 13 and 14 is depicted an alternative embodiment wherein one end of vanes 18 has a helical spring 33 interconnected between the vane and the adjacent frame. That is, one end of helical spring 33 is mounted in a slot 18' in the vane axle 13a while the other end is attached to a reciprocable sliding element 16b' of fixed frame portion 16b. An elongated slot 16b'' allows movement of element 16b' relative to the vane axle 18a. Shifting of sliding element 16b' in one direction applies a clockwise bias on helical spring 33 to bias the vane to one position, e.g., closed, while shifting element 16b' in the opposite direction applies a counterclockwise bias on spring 33 to bias the vane to the other position, e.g., open.

Referring now to FIGS. 15–48, a modified alternative embodiment of the invention is there set forth. The assembly employs the peripheral frame 212 having parallel upright sides 214a and 214b, a top 216a and a bottom 216b parallel to each other.

Figure 37:
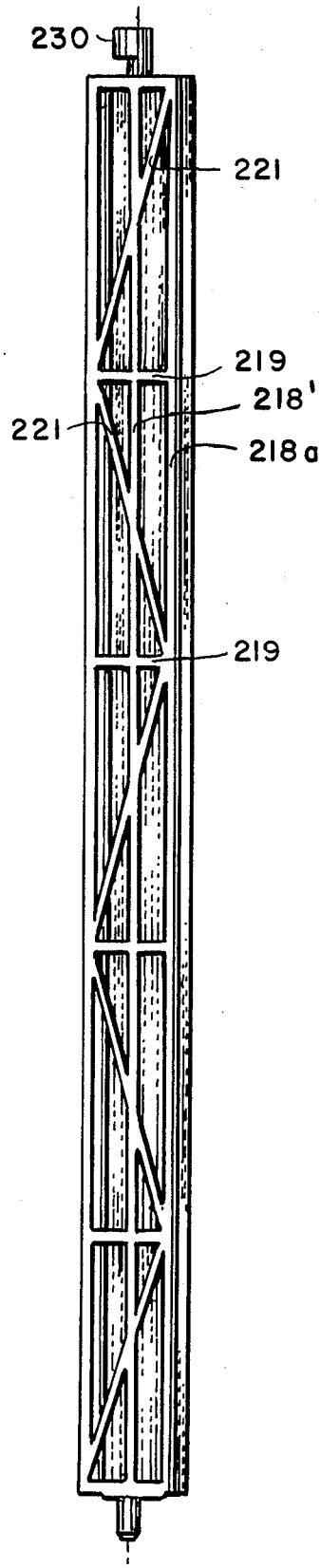
FIG. 37 is a rear elevational view of the vane in FIGS. 35 and 36.
Figure 36:
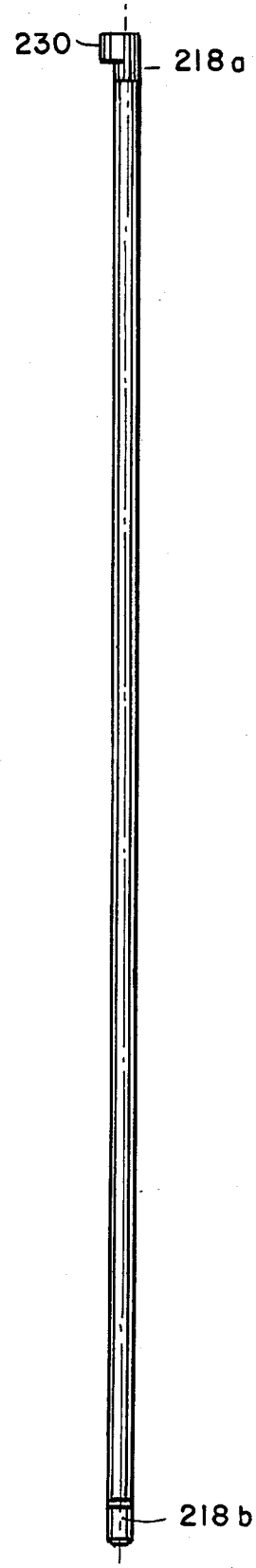
FIG. 36 is an elevational view from the leading edge of the vane in FIG. 35.
Figure 35:
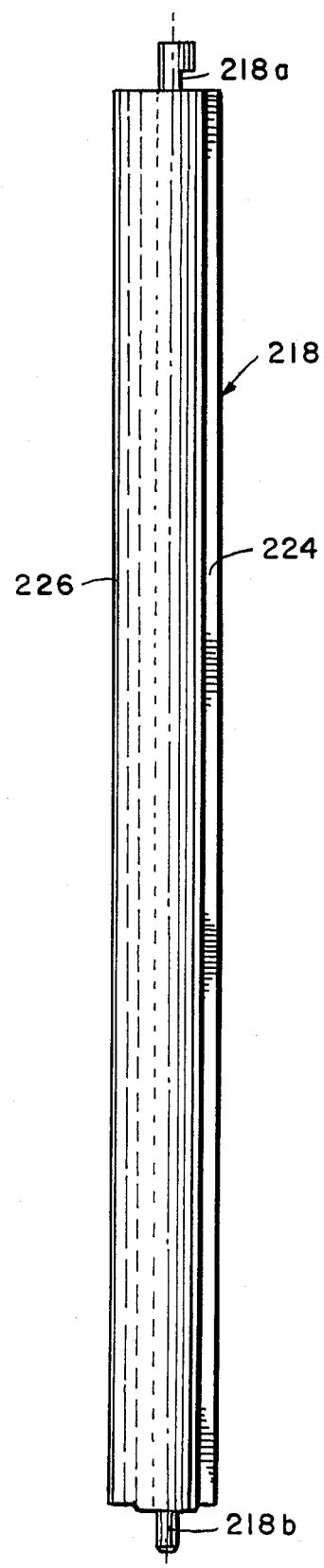
FIG. 35 is a front elevational view of a third form of vane.
Figure 41:
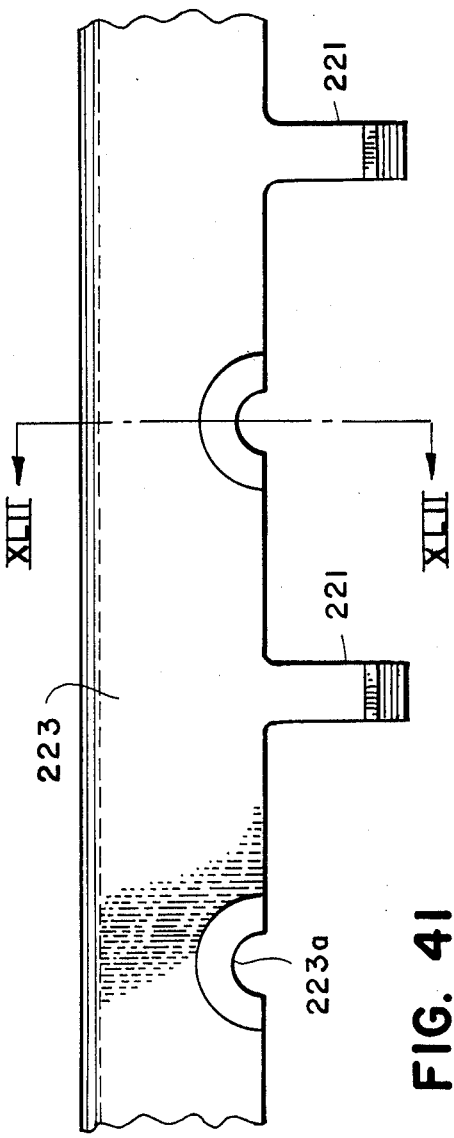
FIG. 41 is a fragmentary view of the locking bar of this embodiment.
Figure 42:
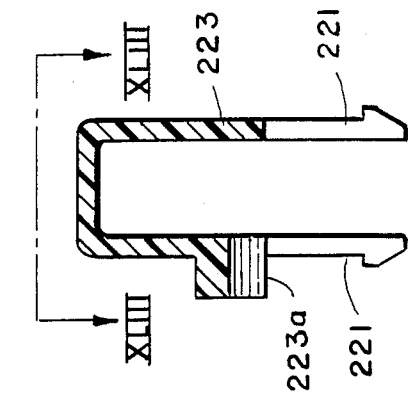
FIG. 42 is a sectional view taken on plane XLII—XLII of FIG. 41.
Figure 43:
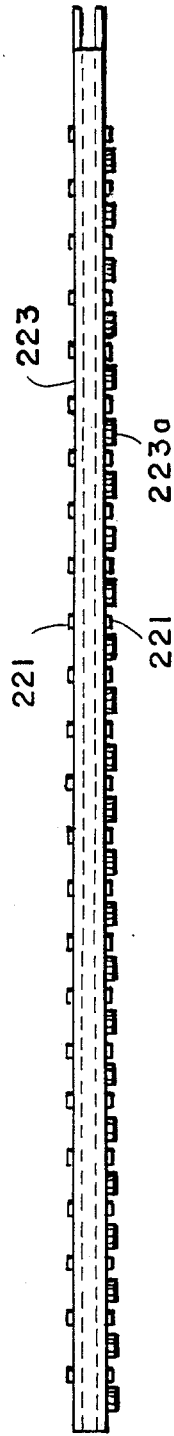
FIG. 43 is a front elevational view of the locking bar in FIGS. 41 and 42, taken in the direction indicated by lines XLIII—XLIII of FIG. 42.
Figure 44:
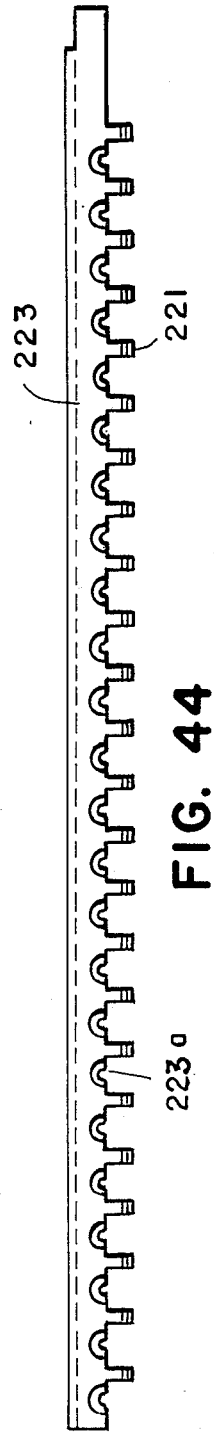
FIG. 44 is a bottom elevational view of the complete locking bar, comparable to FIG. 41, but showing the entire length in smaller dimensions.

Between the top and bottom are mounted a plurality of vertically elongated vanes 218, each having upper and lower coaxial axles 218a and 218b to be rotatable about a common axis. These vanes each have a smooth curvilinear convex streamlined front surface and a hollow ribbed rearwardly open rear surface, as well as a pair of end panels 220 from which axles 218a and 218b extend and with which they are integrally formed. In fact, the entire vane, reinforcing ribs and axles as well as the offset camming FIG. 8, i.e., dumbbell double lobe cam follower 230, are integrally formed of a polymeric material as by injection molding. The particular vane 218 has on its back side, elongated axial, i.e., vertical, ribs 218' along the central axis. At least one of the opposite edges has horizontal transverse reinforcing ribs 219. The vane also has diagonal crisscross ribs 21 (FIG. 37). These ribs provide structural support against deflection under wind pressure, inhibit fluttering, resist torsional distortion and support the vanes against warpage. Yet the structure is lightweight and readily formed as by molding techniques. Each vane has a leading edge 224 and a trailing edge 226. The central axis is closer to the trailing edge than to the leading edge to be thereby offset from the physical center of the vane, thus causing air flow pressure on the leading edge portion of the vane to help retain the vane in a closed position without fluttering. The back side of the leading edge 224 has a notch, while the front side of the trailing edge 226 has a notch. When the vanes are in a closed condition, they overlap such that the leading edge fits within the notch of the trailing edge of the adjacent vane to fit snugly together for closure of the assembly against air flow, and also to form sound retention pockets inhibiting sound transfer from the engine compartment.

These vanes are dimensioned and configured to interfit with the frame subassembly 12. This frame subassembly is specially formed as by molding from a polymeric material, to receive the two opposite vane axles in respective pivot sockets. More specifically, the lower pivot pin or axle of each vane is inserted into a respective bottom socket 216e of bottom member 216b, while the upper axle is laterally inserted into a pivot socket which includes a dead end slot 216f (FIG. 15) in top element 216a of the frame, in cooperation with semicylindrical recesses 223a (FIG. 41) in locking bar 223. This locking bar is U-shaped in cross sectional configuration, fitting within an elongated cavity 222 between flanges on the upper element of the frame. Thus, when the locking bar is slid into slot 222, the semicylindrical surfaces 223a will engage half of the upper axles 218a, while the inner end of the slots 216f will engage the other half. This locking bar also retains in position the slide bar actuator 225. The locking bar is secured in position by having a bayonet type fastener, i.e., (FIG. 42) at the two inner ends of the two legs of the U-shaped member. Specifically each of the individual segments 221 (FIG. 41) thereof has an outer tapered ramp surface forming part of a hook. The locking bar is formed of a resilient polymeric material such that the two legs can be resiliently deformed toward each other during insertion, with the inherent memory thereof causing the hooks to spring back and engage in cooperative recesses in the flanges of the frame for retaining the locking bar and thus the other components noted.

The upper frame element also preferably includes a plurality of protruding stop pins 216h (FIGS. 33 and 34) projecting between the vanes to form a stop surface when engaged by the vanes in the fully open position, and thereby prevent the vanes from moving past center.

Figure 45:
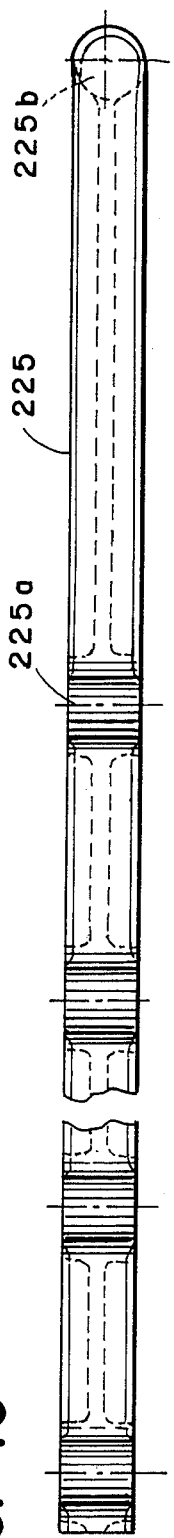
FIG. 45 is a fragmentary enlarged elevational view of the control bar.
Figure 46:
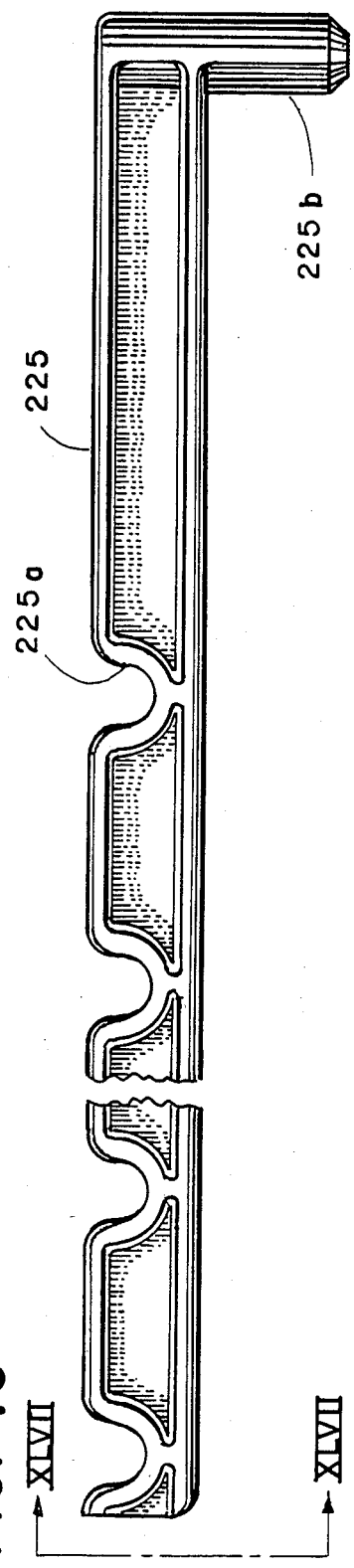
FIG. 46 is a top view of the control bar in FIG. 45.
Figure 47:
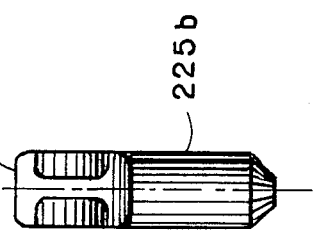
FIG. 47 is an end view taken on plane XLVII—XLVII of FIG. 46.

Slide bar cam actuator 225 (FIGS. 45–47) is an elongated polymeric unit within the outline of the assembly. This ribbed unit is here shown extending across the top of the assembly. (Although this version has the actuator engaging the ends of the vanes, it can actually be mounted to engage the vanes somewhere between the ends, e.g., at the center, as will be described with respect to FIGS. 49–51.) In FIGS. 45–47, it includes semicylindrical recesses 225a having concave inner ends and convex outer edges to receive and cooperate with cam follower lobes on the vane axles. Transverse endwise movement of slide bar 225 in one direction or the opposition direction will rotate the vanes about their respective pivot axes to open and close the vanes. Bar 225 includes a transverse pin 225b at one end engageable by a suitable power actuator mechanism.

The vane 318 depicted in FIGS. 49–51 is one of several like vanes actuable at the center thereof, i.e., between its ends, rather than at one end as in the previous embodiments. The vane includes end stub axles 318a and 318b. It has a smooth curvilinear front and a hollow ribbed rear. The trailing edge is further from the pivot axis than the leading edge, and is mounted to overlap the leading edge of the adjacent vane when mounted, but is not offset. The dumbbell lobe cam follower 330 extends transversely from the central axle 318c of the vane, for engagement with a centrally positioned actuator bar (not shown) like the actuator bar previously described as located at one end of the vanes.

Figure 48:
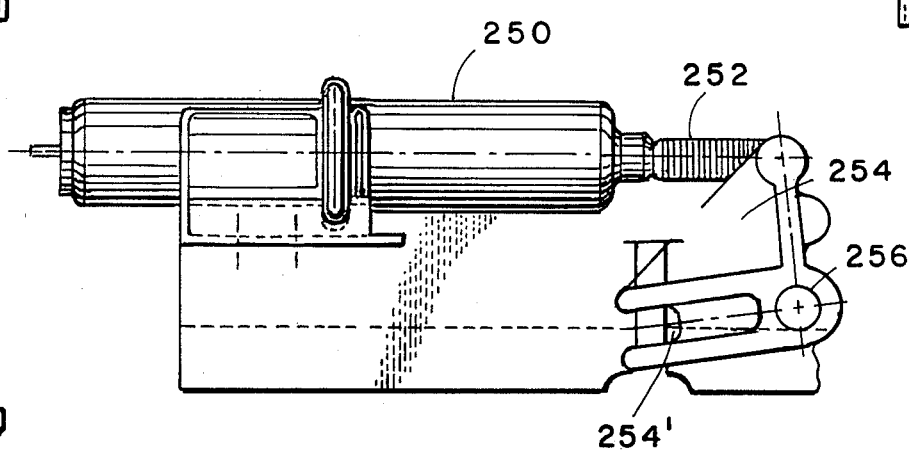
FIG. 48 is an elevational view of an electrothermal actuator and bell crank for a control bar positioned centrally of the vanes as in the embodiment in FIGS. 49-51.
Figure 17:
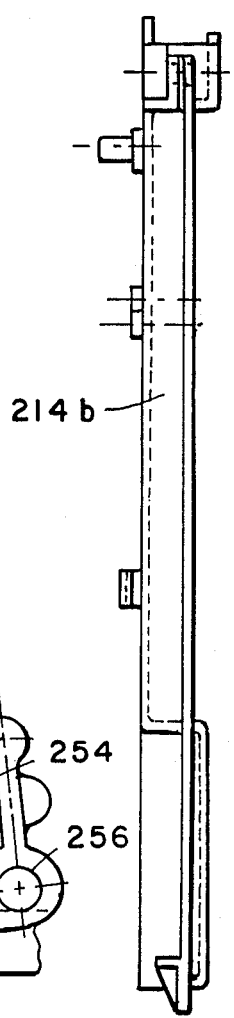
FIG. 17 is an end elevational view from the right end of FIG. 15.
Figures 18, 19:
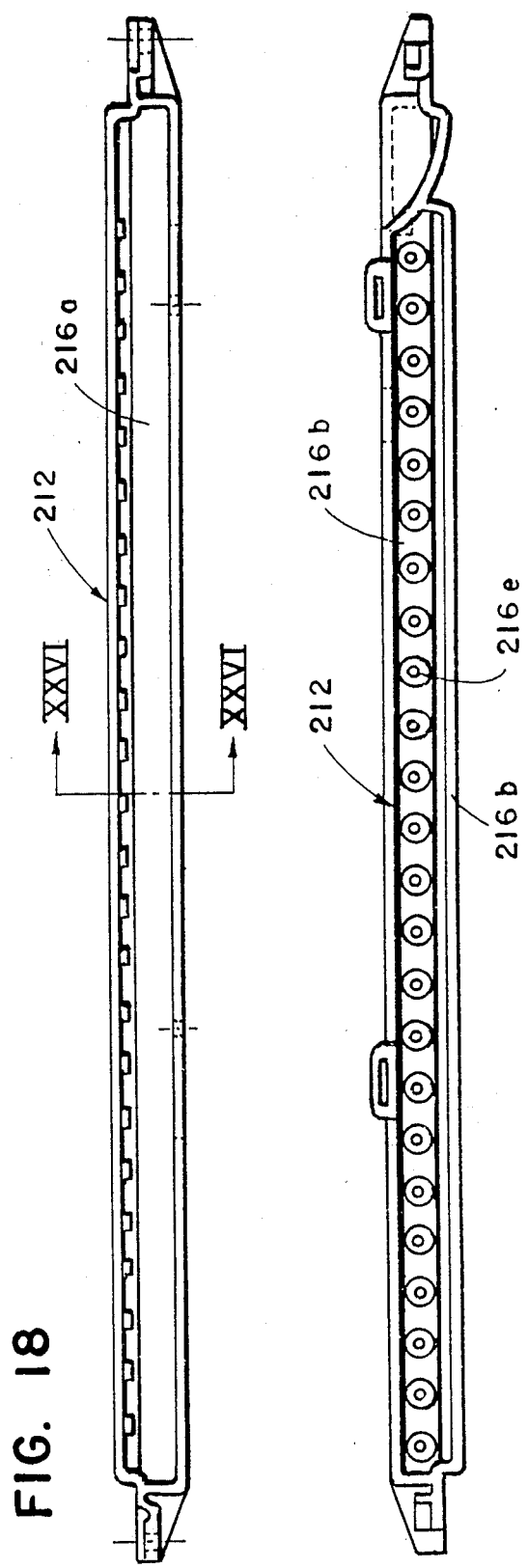
FIG. 18 is a top plan view of the member in FIG. 15.
FIG. 19 is a bottom view of the member in FIG. 15.
Figure 20:
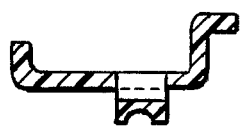
FIG. 20 is a sectional view taken on plane XX—XX of FIG. 15.
Figure 21:
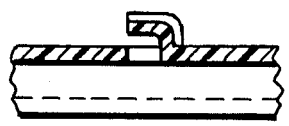
FIG. 21 is a sectional view taken on plane XXI—XXI of FIG. 15.
Figure 22:
FIG. 22 is a sectional view taken on plane XXII—XXII of FIG. 15.
Figure 23:
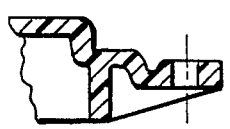
FIG. 23 is a sectional view taken on plane XXIII—XXIII of FIG. 15.
Figure 24:
FIG. 24 is a sectional view taken on plane XXIV—XXIV of FIG. 15.
Figure 25:
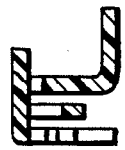
FIG. 25 is a sectional view taken on plane XXV—XXV of FIG. 15.
Figure 26:
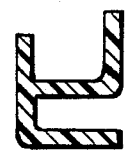
FIG. 26 is a sectional view taken on plane XXVI—XXVI of FIG. 18.
Figure 27:
FIG. 27 is a sectional view taken on plane XXVII—XXVII of FIG. 15.
Figure 28:
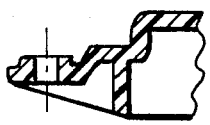
FIG. 28 is a sectional view taken on plane XXVIII—XXVIII of FIG. 15.
Figure 29:
FIG. 29 is a sectional view taken on plane XXIX—XXIX of FIG. 15.
Figure 30:
FIG. 30 is a sectional view taken on plane XXX—XXX of FIG. 15.
Figure 31:
FIG. 31 is a sectional view taken on plane XXXI—XXXI of FIG. 15.
Figure 32:
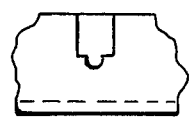
FIG. 32 is a fragmentary view of a section of the frame taken in the direction of the arrow XXXII in FIG. 15.
Figure 33:
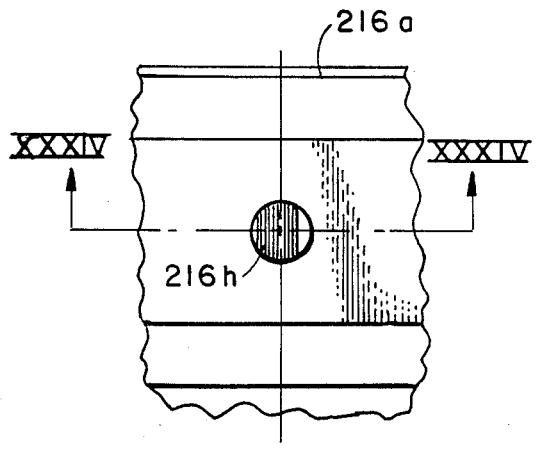
FIG. 33 is an enlarged fragmentary sectional view of the portion of the frame identified by numeral XXXIII in FIG. 15.
Figure 34:
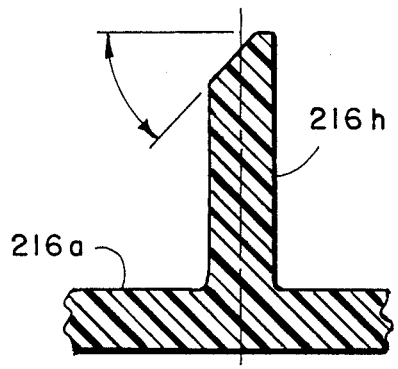
FIG. 34 is a sectional view taken on plane XXXIV—XXXIV of FIG. 33.

In FIG. 48, a power actuator mechanism for operating a centrally positioned actuator is shown. It comprises an electrothermal actuator 250 fixedly mounted and having its outer piston rod 252 pivotally engaged with a crank actuator 254 mounted on a pivot pin 256 and having a slot 254' to receive transverse pin 224b for shifting thereof back and forth. This shiftably operates the actuator slide bar and thus pivot the vanes between open and closed positions.

Figure 52:
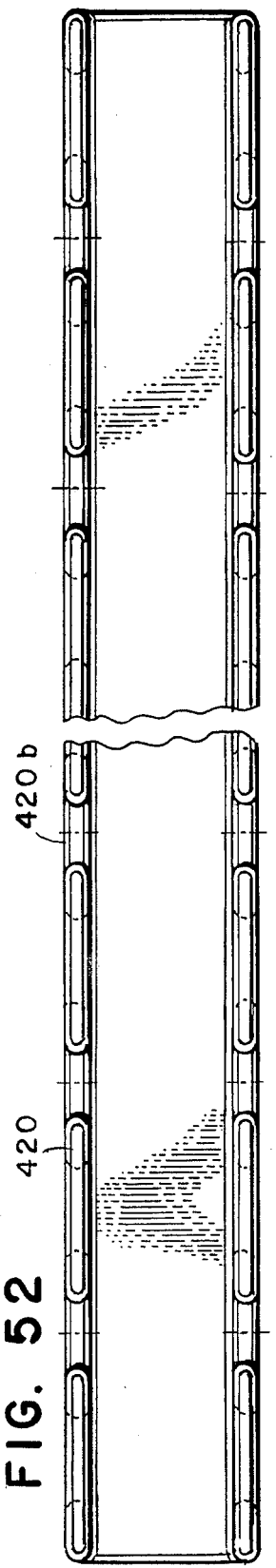
FIG. 52 is an elevational view of an alternate type retainer or locking bar.
Figure 53:
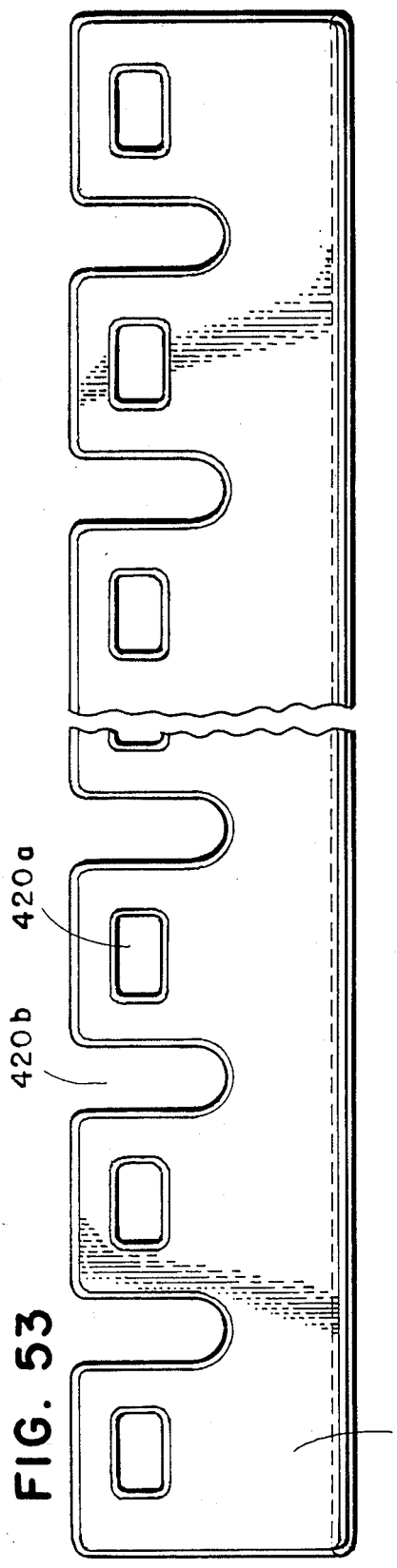
FIG. 53 is a top plan view of the retainer bar in FIG. 52.
Figure 54:
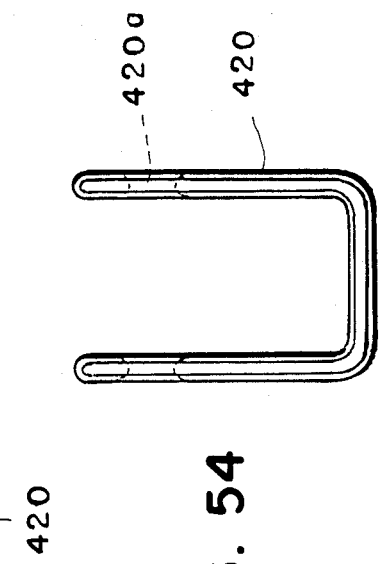
FIG. 54 is an end elevational view of the retainer bar in FIGS. 51 and 52.

In FIGS. 52–54 is depicted an alternative elongated locking or retention bar 420 to that previously shown and described. This bar is also U-shaped with a pair of parallel legs transverse to the connecting leg. Both parallel legs are shown to include transverse slots 420b to fit around the stub axles of the vanes when assembly is made. This bar is intended to straddle the two flanges on the frame, however, instead of being inserted between them. Thus, the hook elements (not shown) are on the frame flanges rather than on the locking bar, and the hook-receiving openings 420a are on the locking bar rather than the flanges. The member is of resilient material, preferably polymeric, to enable the legs to be temporarily deformable for snapping engagement with the frame, to lock the actuator bar and vanes into position. This variation is preferably used with the center actuated vanes in FIGS. 49–51.

All of the variations taught and shown are formable by injection molding or the equivalent. The members are lightweight, few in number and readily assembled. The assembly is thin and has all of the operative components within the outline.

Conceivably, other variations to the specific illustrative apparatus depicted could be made within the invention taught. It is intended that the invention is to be limited only by the scope of the appended claims and the reasonably equivalent structures to those defined therein, rather than to the embodiments depicted.

The embodiments of the invention in which an exclusive property or privilege is claimed are defined as follows.

1. A polymeric shutter assembly for an engine comprising:
    a polymeric peripheral frame defining an open space therewithin and including a pair of opposite parallel side frame portions and a pair of opposite parallel top and bottom frame portions;
    a plurality of spaced sockets along the length of one of said pair of opposite portions, the sockets in one such portion being aligned with respective sockets in the other such portion;
    the sockets in at least one of said opposite portions being elongated slots;
    a plurality of vertically elongated rotational polymeric vanes across said open space mounted parallel to each other and rotational between overlapping closed position for closing said open space for noise abatement and spaced open position for opening said open space for air flow therethrough;
    integral pivot axles at the ends of said vanes fitted in said sockets, and axle retention means for retaining said axles in said sockets;
    means for rotating said vanes between said closed and open positions;
    said elongated slots having an open end, and said axle retention means comprising lock bar means over said open ends for retaining the pivot axles and an elongated actuator bar;
    said means for rotating said vanes including an elongated actuator bar laterally offset of said axles and movable lengthwise of itself and transversely of the pivot axles of said vanes, said actuator bar having curvilinear recesses adjacent said vanes, and said vanes including integral cam followers having a curvilinear lobe slidingly received by respective ones of said recesses in said slide bar, whereby axial movement of said slide bar rotates said vanes via said cam followers.

2. The shutter assembly in claim 1 wherein said lock bar means comprises an elongated polymeric lock bar lockingly interengageable with said frame, said lock bar restricting said slide bar to axial movement and providing bearing support therefor.

3. The shutter assembly in claim 2 wherein said lock bar also retains said actuator bar, has a U-shaped cross section with resilient legs on the U, and is engageable with said frame by hook means.

4. The shutter assembly in claim 2 wherein said upper and lower portions include said sockets, and said upper portion includes flanges defining an elongated cavity adjacent said slots and said pivot axles, said actuator is received in said elongated cavity, said lock bar is U-shaped in cross section, including upper and lower legs which are resilient with respect to each other; and said lock bar is lockingly engageable with said flanges to retain said actuator bar and said vanes with respect to said frame while providing bearing surfaces for said actuator bar and vanes.

5. The polymeric shutter assembly in claim 1 wherein said vanes are integral, have a solid front and a hollow rear, and have rear reinforcing ribs along the leading edge, the trailing edge and diagonally of said vanes.

6. The shutter assembly in claim 1 including vane biasing means on each said vane to allow said vanes to be biased to the open or closed position.

7. The shutter assembly in claim 6 including shifting means for said vane biasing means for selective biasing of the vanes to either the open or the closed condition.

8. The shutter assembly in claim 1 wherein said cam followers are at an end of said vanes.

9. The shutter assembly in claim 1 wherein said cam followers are between the ends of said vanes.

10. A polymeric shutter assembly for an engine comprising:
a polymeric peripheral frame defining an open space therewithin and including a pair of opposite side portions and a pair of opposite top and bottom portions;
a plurality of spaced sockets on one of said pair of opposite portions of said frame;
a plurality of elongated rotational polymeric vanes across said open space mounted parallel to each other and rotational between overlapping positions closing said open space, and spaced positions opening said open space for air flow therethrough;
integral pivot axles at the ends of said vanes fitted in said sockets, and lock bar means for retaining said axles in said sockets;
cam actuator means for rotating said vanes including an elongated slide bar movable axially of itself, and transversely of the pivot axles of said vanes, having curvilinear recesses adjacent said vanes, and said vanes including respective FIG. 8 cam followers on an end thereof, said cam followers having curvilinear lobes slidingly received by respective ones of said recesses in said slide bar, whereby axial movement of said slide bar rotates said vanes via said cam followers, and the movement of said slide bar being restricted to said axial movement by said lock bar retaining means.

11. The shutter assembly in claim 10 wherein said lock bar has a U-shaped cross section with an upper leg and a lower leg, said lower leg has slots coincident with said first mentioned slots, to fit over said axles, and said lock bar has resilient interconnecting retention means with said polymeric frame for retaining said lock bar, said cam actuator and said vanes in assembled position.

* * * * *

UNITED STATES PATENT AND TRADEMARK OFFICE
CERTIFICATE OF CORRECTION

PATENT NO. : 4,753,288
DATED      : June 28, 1988
INVENTOR(S): William O. Harvey It is certified that error appears in the above-identified patent and that said Letters Patent is hereby corrected as shown below: On the title page:

Abstract, line 12;
    "than" should be -- that --;

Column 1, line 66;
    "FIG. 8" should be -- figure 8 --;

Column 5, line 13;
    "FIG. 8" should be -- figure 8 --;

Column 5, line 17;
    "FIG. 8" should be -- figure 8 --;

Column 5, line 25;
    "FIG. 8" should be -- figure 8 --;

Column 5, line 63;
    "FIG. 8" should be -- figure 8 --;

Column 6, line 8;
    "13a" should be -- 18a --;

Column 6, line 32;
    "FIG. 8" should be -- figure 8 --;

Column 10, line 17, Claim 10;
    "FIG. 8" should be -- figure 8 --.

Signed and Sealed this

Twenty-second Day of November, 1988

Attest:

DONALD J. QUIGG

Attesting Officer      Commissioner of Patents and Trademarks